(12) United States Patent
Chow et al.

(10) Patent No.: US 6,885,666 B1
(45) Date of Patent: Apr. 26, 2005

(54) APPARATUS AND METHOD IN A NETWORK SWITCH FOR SYNCHRONIZING TRANSFER OF A CONTROL TAG TO A SWITCH FABRIC WITH TRANSFER OF FRAME DATA TO A BUFFER MEMORY

(75) Inventors: Peter Ka-Fai Chow, San Jose, CA (US); Somnath Viswanath, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 814 days.

(21) Appl. No.: 09/637,016

(22) Filed: Aug. 14, 2000

(51) Int. Cl.[7] ............................................. H04L 12/50
(52) U.S. Cl. ...................... 370/392; 370/474; 370/503; 370/412
(58) Field of Search ................................ 370/369, 390, 370/401, 392, 412–413, 419–421, 466, 389, 503, 507, 912, 411; 709/225, 238, 242

(56) References Cited

U.S. PATENT DOCUMENTS

| | | | | |
|---|---|---|---|---|
| 5,898,687 A | * | 4/1999 | Harriman et al. | ........... 370/390 |
| 5,917,820 A | * | 6/1999 | Rekhter | ...................... 370/392 |
| 5,920,568 A | * | 7/1999 | Kurita et al. | ................ 370/412 |
| 5,953,335 A | | 9/1999 | Erimli et al. | |
| 6,049,834 A | * | 4/2000 | Khabardar et al. | ......... 709/242 |
| 6,104,696 A | * | 8/2000 | Kadambi et al. | ........... 370/218 |
| 6,172,990 B1 | * | 1/2001 | Deb et al. | .................... 370/474 |
| 6,181,699 B1 | * | 1/2001 | Crinion et al. | ............... 370/392 |
| 6,424,632 B1 | * | 7/2002 | Poret et al. | .............. 370/395.3 |
| 6,449,275 B1 | * | 9/2002 | Andersson et al. | .... 370/395.31 |
| 2001/0043614 A1 | * | 11/2001 | Viswanadham et al. | .... 370/469 |
| 2002/0062372 A1 | * | 5/2002 | Hong et al. | .................. 709/225 |

\* cited by examiner

*Primary Examiner*—Kenneth Vanderpuye
*Assistant Examiner*—Ian N. Moore
(74) *Attorney, Agent, or Firm*—Manelli Denison & Selter PLLC; Leon R. Turkevich; Edward J. Stemberger

(57) ABSTRACT

A network switch port includes a port filter configured to receive at least a portion of a data frame including layer 3 information and to generate a tag result. A queue block is configured for transferring the data frame to a buffer memory. A switch fabric is configured for receiving the tag result and for performing a frame forwarding switching decision based on the tag result and monitoring of the transfer of the data frame. A synchronizing device is configured to synchronize the transfer of a valid tag result to the switch fabric with the transfer of the at least a portion of the data frame to the buffer memory based on a signal from the queue indicating a status of the transfer of the portion of the data frame to the buffer memory.

10 Claims, 4 Drawing Sheets

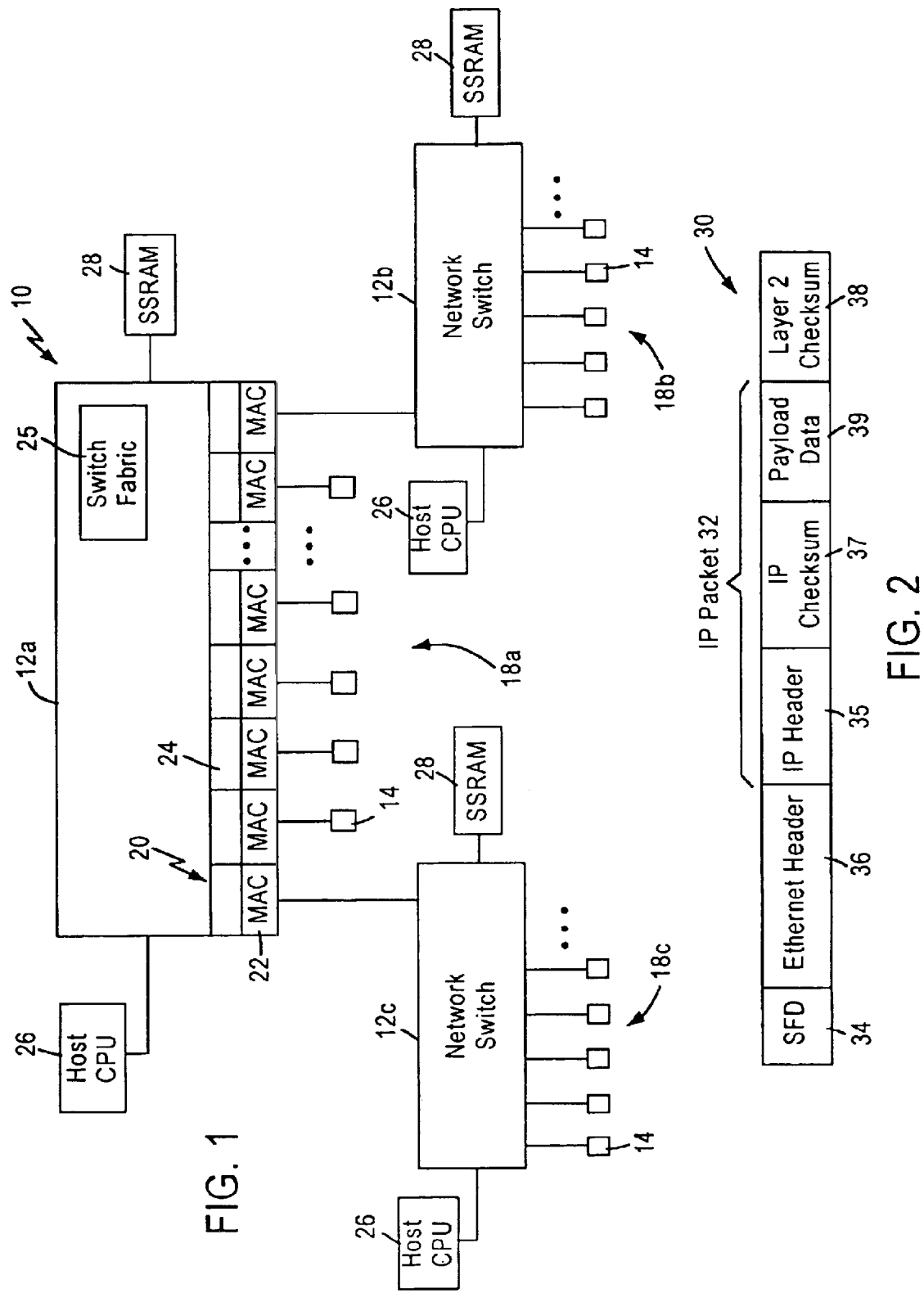

APPARATUS AND METHOD IN A NETWORK SWITCH FOR SYNCHRONIZING TRANSFER OF A CONTROL TAG TO A SWITCH FABRIC WITH TRANSFER OF FRAME DATA TO A BUFFER MEMORY

BACKGROUND OF THE INVENTION

1. Field of the Invention

The present invention relates to layer 2 (and above) switching of data packets in a non-blocking network switch configured for switching data packets between subnetworks and more particularly to synchronizing transfer of a data frame to a buffer memory with the transfer of a frame tag result to a switch fabric.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a non-blocking mode, where data packets can be output from the switch at the same rate that the data packets are received. Newer designs are needed to ensure that higher speed switches can provide both layer 2 and above switching capabilities for faster speed networks such as 100 Mbps or gigabit networks.

However, such design requirements risk loss of the non-blocking features of the network switch, as it becomes increasingly difficult for the switching fabric of a network switch to be able to perform layer 3 processing at the wire rates (i.e., the network data rate).

Conventionally, a switch fabric of a network switch snoops on the write bus to obtain data needed for making frame forwarding decisions. Typically, when a first packet is received by a switch port, the packet is transferred to an external buffer memory. During the time the first packet is sent to the external memory, a second packet can be received by the switch port and tagged. The switch fabric will try to send the packet out, but the switch fabric may inappropriately correspond the tag associated with the second packet, with the first packet.

SUMMARY OF THE INVENTION

There is a need for an arrangement that enables a network switch to provide layer 2 switching and layer 3 switching capabilities for 100 Mbps and gigabit links without blocking of the data packets.

There is also a need for an arrangement in a network switch that synchronizes transfer of a frame tag to a switch fabric with the transfer of frame data to a buffer memory.

These and other needs are attained by the present invention, where a network switch port includes a port filter configured to receive at least a portion of a data frame including layer 3 information and to generate a tag result. A queue block is configured for transferring the data frame to a buffer memory. A switch fabric is configured for receiving the tag result and for performing a frame forwarding switching decision based on the tag result and monitoring of the transfer of the data frame. A synchronizing device is configured to synchronize the transfer of a valid tag result to the switch fabric with transfer of the at least a portion of the data frame to the buffer memory based on a signal from the queue indicating a status of the transfer of the portion of the data frame to the buffer memory.

Another aspect of the invention provides a method of synchronizing transfer of frame tags to a switch fabric with the transfer of data frames to a buffer memory. The method includes receiving, at a network switch, at least a portion of a data frame including layer 3 information. A tag result is generated which corresponds to at least a portion of the data frame. Transfer of the tag result to a switch fabric is synchronized with the transfer of at least a portion of the data frame to a buffer memory based on a signal indicating a status of the transfer of the portion of the data frame to the buffer memory.

Thus, the invention provides synchronized transfer of frame tags to a switch fabric the transfer of the frame data to a buffer memory.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein:

FIG. 1 is a block diagram of a packet switched network including multiple network switches for switching data packets between respective subnetworks according to an embodiment of the present invention.

FIG. 2 is a diagram illustrating a conventional layer 2 Ethernet-type data packet carrying a layer three Internet Protocol (IP) packet

BEST MODE FOR CARRYING OUT THE INVENTION

Figure 3:
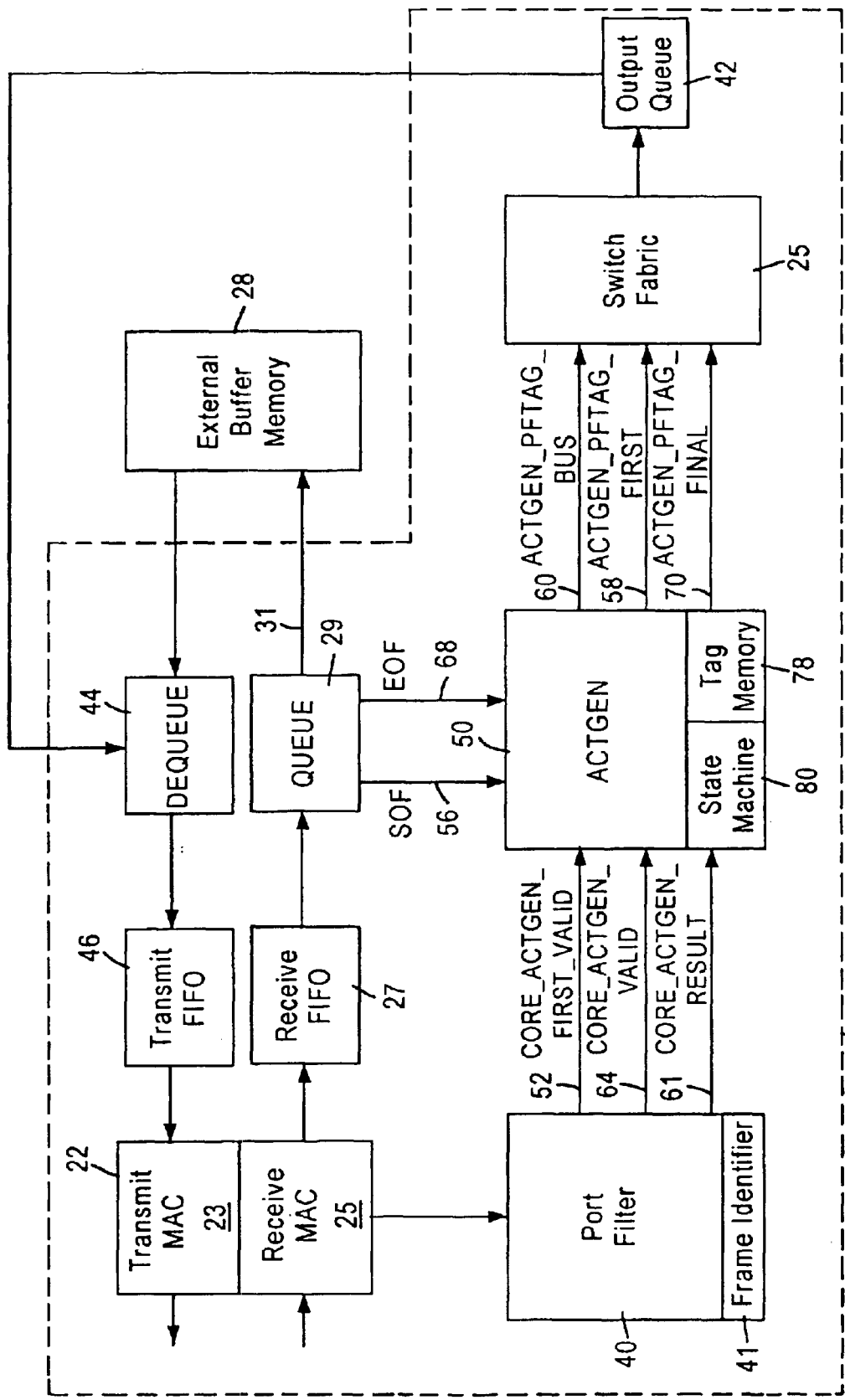
FIG. 3 is a block diagram illustrating the network switch of FIG. 1 in further detail.

FIG. 1 is a block diagram illustrating a packet switched network 10, such as an Ethernet (IEEE 802.3) network. The packet switched network includes integrated (i.e., single chip) multiport switches 12 that enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks 18a, 18b, and 18c. Hence, each subnetwork includes a switch 12, and an associated group of network stations 14.

Each switch 12 includes a switch port 20 that includes a media access control (MAC) module 22 and a packet classifier module 24. The MAC module 20 transmits and receives data packets to the associated network stations 14 across 10/100 Mbps physical layer (PHY) transceivers (not shown) according to IEEE 802.3u protocol. Each switch 12 also includes a switch fabric 25, also referred to as an internal rules checker (IRC), configured for making frame forwarding decisions for received data packets. In particular, the switch fabric 25 is configured for layer 2 switching decisions based on source address, destination address, and VLAN information within the Ethernet (IEEE 802.3) header; the switch fabric 25 is also configured for selective layer 3 switching decisions based on evaluation of an IP data packet within the Ethernet packet.

As shown in FIG. 1, each switch 12 has an associated host CPU 26 and a buffer memory 28, for example an SSRAM. The host CPU 26 controls the overall operations of the corresponding switch 12, including programming of the switch fabric 25. The buffer memory 28 is used by the corresponding switch 12 to store data frames while the switch fabric 25 is processing forwarding decisions for the received data packets. Hence, each network switching system includes a integrated switch, 12, a host CPU 26, and a buffer memory 28.

As described above, the switch fabric 25 is configured for performing layer 2 switching decisions and layer 3 switching decisions. The availability of layer 3 switching decisions may be particularly effective if an end station 14 within subnetwork 18a wishes to send an e-mail message to selected network stations in subnetwork 18b, 18c, or both; if only layer 2 switching decisions were available, the switch fabric 25 of switch 12a would need to send the e-mail message to a router (not shown), which would introduce additional delay. Use of layer 3 switching decisions by the switch fabric 25 enables the switch fabric 25 to make intelligent decisions as far as how to handle a packet, including advanced forwarding decisions, and whether a packet should be considered a high-priority packet for latency-sensitive applications, such as video or voice.

FIG. 2 is a diagram illustrating an Ethernet (IEEE 802.3) packet 30 carrying an IP packet 32 as payload data. Specifically, the Ethernet packet 30 includes a start frame delimiter (SFD) 34, an Ethernet header 36, a layer 2 checksum 38 and the IP packet 32. The IP packet 32 includes an IP header 35, an IP checksum field 37, and payload data 39. Hence, a switch fabric 25 configured for layer 3 switching decisions needs to be able to quickly process the IP packet 32 within the received Ethernet frame 30 to avoid blocking of the frame within the switch.

According to the disclosed embodiment, the packet classifier module 24, also referred to as a network switch port filter, is configured for identifying (i.e., evaluating) the incoming data packet at the network switch port 20, and supplying to the switch fabric 25 a tag that specifies the action to be performed on the data packet based on type of data packet being received. Specifically, the packet classifier module 24 simultaneously compares the incoming data packet with a plurality of templates configured for identifying respective data formats. The packet classifier module 24, based on the comparison between the incoming data packet and the plurality of templates, identifies an equation to be executed that specifies the tag to be supplied to the switch fabric 25. Specifically, users of the host processor 26 will specify policies that define how data packets having certain IP protocols should be handled by the switch fabric 25. These policies are implemented by loading into the switch fabric 25 a set of frame forwarding decisions for each corresponding IP protocol type. Hence, the switch fabric 25 could include one set of frame forwarding instructions for an HTTP packet, another set of frame forwarding instructions for an SNMP packet, and another set of frame forwarding instructions for a highs priority packet (e.g., video, or voice, etc.).

With reference to FIG. 3, the network switch 12 includes a MAC module 22 including a transmit MAC portion 23 and a receive MAC portion 25, a receive FIFO buffer 27, a queue block 29, the switch fabric 25, an output queue 42, a dequeue block 44, and a transmit FIFO buffer 46. The queue block 29 and the dequeue block 44 are configured to transfer layer 2 information to and from the external buffer memory 28. The external buffer memory 28 receives data from the queue block 29 via a write bus 31 on the write bus 31.

The network switch port 20 also includes a port filter 40 that includes a frame identifier 41. The part filter 40 is configured for performing various layer 3 and above classification, for example identifying whether the incoming data packet includes a layer 3 IP datagram. The frame identifier 41 is configured for identifying the beginning of the IP frame, and locating the layer 3 address entries as the IP frame is received from the network. In particular, the frame identifier identifies the start position of the IP source address, IP destination address, TCP/UDP source port, and TCP/UDP destination port as the data is being received.

In accordance with the disclosed embodiment, the port filter 40 outputs a CORE_ACTGEN_FIRST_VALID signal 52 indicating that a first result is valid for receipt by a synchronization device (ACTGEN) 50. The first result relates to a portion of the data frame such as the first 64 bytes of data. The ACTGEN 50 receives the first result of equation evaluation via the 64 bit CORE_ACTION_RESULT bus 61. The CORE_ACTGEN_FIRST_VALID signal 52 is shown in FIG. 3 and in the waveform of FIG. 4. In response to the signal 52, a FIRST_RESULTS_READY signal 54 is generated in the ACTGEN 50 which preserves the pulse signal 52 for additional time. The ACTGEN 50 receives a start of frame signal (MP_MS_RB_STAT[0]) 56 from the queue block 29 as the queue block 29 begins to transfer frame data to the external buffer memory 28 via the write bus 31.

An ACTGEN_PFTAG_FIRST signal 58 is generated in response to the signal 52 and the start of frame signal 56. It is noted that in the embodiment of FIG. 4, the CORE_ACTGEN_FIRST VALID signal 52 occurs before the start of frame signal 56. It can be appreciated that the ACTGEN_PFTAG_FIRST signal 58 can be generated even if the start of frame signal 56 occurs before the CORE_ACTGEN_FIRST_VALID signal 52. The ACTGEN_PFTAG_FIRST signal 58 also causes resetting of the FIRST_RESULTS_READY signal 54. The occurrence of the ACTGEN_PFTAG_FIRST signal 58 indicates to the switch fabric 25 that the first tag result 62 (e.g. a tag result for the first 64 bytes) is ready for transfer (via ACTGEN_PFTAG_BUS 60) so as to be in sync with the transfer of frame data to the buffer memory 28. Thus, if the switch fabric needs data immediately, (e.g. within the first 64 bytes), there is no need to wait for the end of the frame before sending the first tag result 62 to the switch fabric 25.

Figure 4:
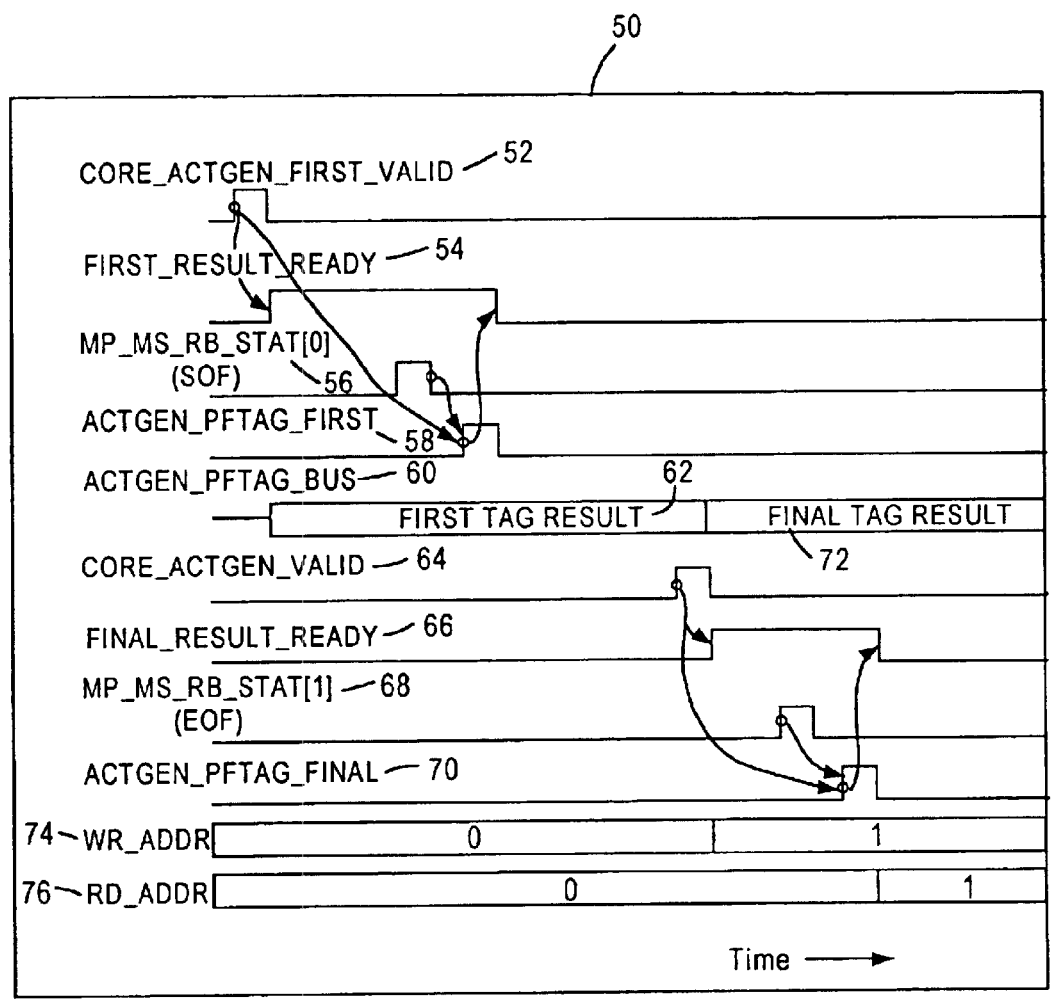
FIG. 4 is an illustration of a waveform of the tag generation bock of the invention.

Next, with reference to FIG. 4, the port filter 40 outputs a CORE_ACTGEN_VALID signal 64 indicating that a final result is valid for receipt by the synchronization device (ACTGEN) 50. The final result relates to the entire data frame (including the first 64 bytes of data). In response to the signal 64, a FINAL_RESULTS_READY signal 66 is generated in the ACTGEN 50 which preserves the pulse signal 64. The ACTGEN 50 receives an end of frame signal (M_MS_RB_STAT [1]) from the queue block 29 as the end of frame data is received by the receive FIFO 27. An ACTGEN_PFTAG_FINAL signal 70 is generated in response to the signal 64 and end of frame signal 68. It is noted that in the embodiment of FIG. 4, the CORE_ACTGEN VALID signal 64 occurs before the end of frame signal 68. It can be appreciated that the ACTGEN_PFTAG_FINAL signal 70 can be generated even if the end of frame signal 68 occurs before the CORE_ACTGEN_VALID signal 64. The ACTGEN_PFTAG_FINAL signal 70 also causes resetting of the FINAL_RESULTS_READY signal 66. The occurrence of the ACTGEN_PFTAG_FINAL signal 70 indicates when a final tag result 72 (e.g. a tag result for the entire frame) is transferred to the switch fabric 25 so as to be in sync with the transfer of the end of frame data to the buffer memory 28.

As shown in FIG. 3, the ACTGEN 50 includes memory 78 for temporarily storing the final tag result 72 and the first tag result 62 before they are sent to the switch fabric 25.

FIG. 4 also shows a write address WR_ADDR 74 and a read address RD_ADDR 74 which are pointers for the final tag result 72 stored in the memory 78 (FIG. 3) of the ACTGEN 50.

Figure 5:
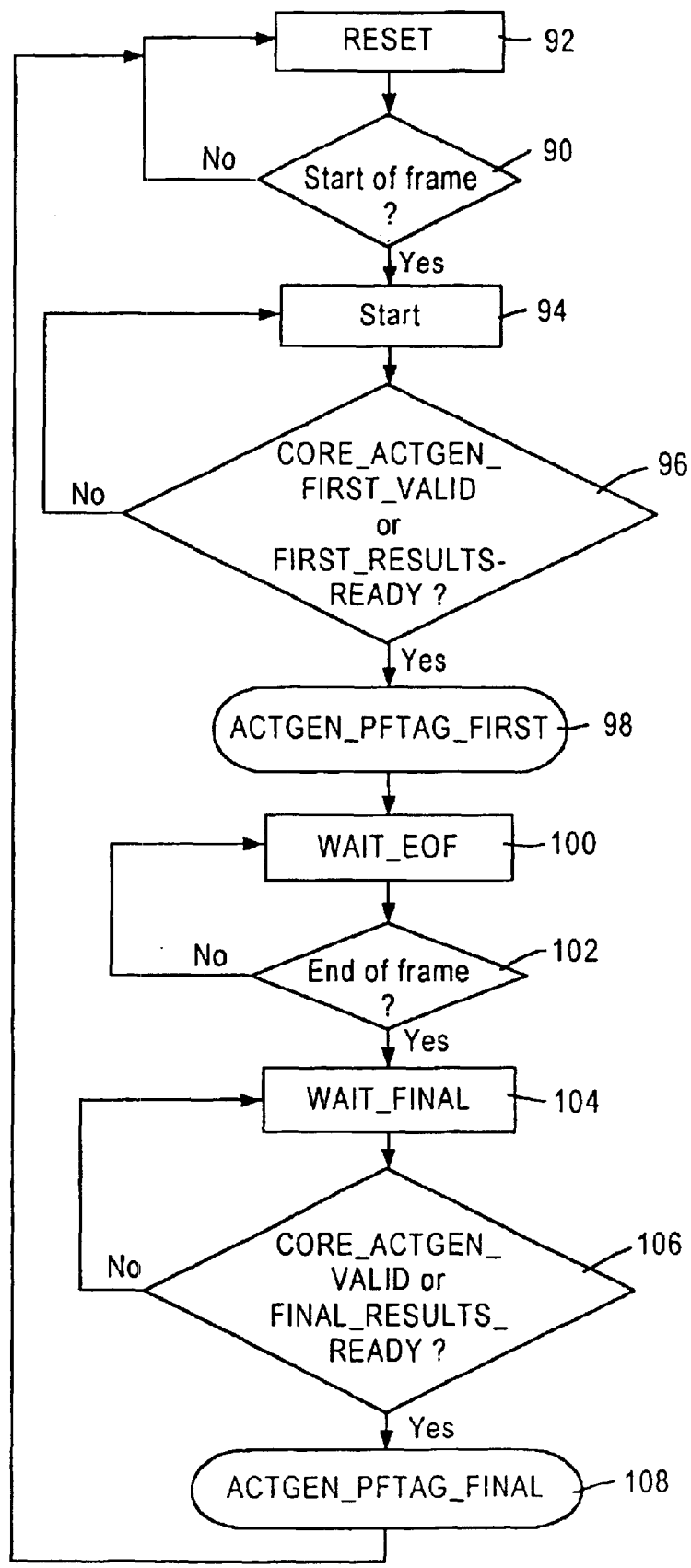
FIG. 5 is a flow diagram of the state machine of the tag generation bock of the invention.

The ACTGEN 50 also includes a state machine 80 which is implemented to keep track of sending the ACTGEN_PFTAG_FIRST signal 58 and the ACTGEN_PFTAG_FINAL signal 70 to the switch fabric 25. A flow chart of the functions of the state machine 80 is shown in FIG. 5. First, the state machine determines if a start of a frame is being received in step 90. If no frame is received, a reset function is initiated in step 92 and if a start of frame is detected, a start function is initiated in step 94. Step 96 determines if the CORE_ACTGEN_FIRST_VALID signal 52 or the FIRST_RESULTS_READY signal 54 is received by the ACTGEN 50. If one of these signals 52 or 54 detected, the ACTGEN_PFTAG_FIRST signal 58 is generated in step 98. A waiting period is defined in step 100 to wait for the end of the frame. Step 102 determines if the end of the frame 68 is detected and if so, another waiting period is provided in step 104. Step 106 determines if the CORE_ACTGEN_VALID signal 64 or the FINAL_RESULT_READY signal 66 is received and if so, the ACTGEN_PFTAG_FINAL signal is generated in step 108.

Hence, the ACTGEN 50 provides transfer to the switch fabric of frame tags synchronized with the transfer of frame data to the buffer memory. More particularly, the tags are divided into a first tag result and a final tag result which are sent to the switch fabric in sync with the start of frame data and end of frame data, respectively, to the buffer memory.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of synchronizing transfer of frame tags to a switch fabric with the transfer of data frames to a buffer memory, the method comprising:

receiving, at a network switch port, at least a portion of a data frame including layer 3 information, generating a tag result corresponding to at least a portion of the data frame, synchronizing transfer of the tag result to a switch fabric with transfer of at least a portion of the data frame to a buffer memory based on a signal indicating a status of the transfer of the portion of the data frame to the buffer memory, and storing the portion of the data frame in the buffer memory, wherein the step of generating a tag result includes generating the tag result by the network switch port, and wherein the step of generating a tag result includes generating a first tag result by the network switch port, and synchronizing transfer of the first tag result is based on a signal from a queuing device indicating a start of frame.

2. The method of claim 1, wherein the step of generating a tag result includes generating a final tag result by the network switch port, and synchronizing transfer of the final tag result is based on a signal from the queuing device indicating an end of frame.

3. The method of claim 2, further comprising storing the first and final tag result in memory prior to transfer to the switch fabric.

4. The method of claim 1, further comprising generating a preserving signal to preserve a signal indicating that the first tag result is valid, and to reset the preserving signal when the first tag result is transferred to the switch fabric.

5. The method of claim 2, further comprising generating a preserving signal in response to a determination that the final tag result is valid, and resetting the preserving signal when the final tag result is transferred to the switch fabric.

6. A network switch comprising:

a switch port having a port filter configured to receive at least a portion of a data frame including layer 3 information and to generate a tag result, a queue block configured for transferring the data frame from the switch port to a buffer memory, a switch fabric configured for receiving the tag result and for performing a frame forwarding switching decision based on the tag result and monitoring of the transfer of the data frame, and a synchronizing device configured to synchronize the transfer of the tag result to the switch fabric with the transfer of the at least a portion of the data frame to the buffer memory based on a signal from the queue block indicating a status of the transfer of the portion of the data frame to the buffer memory, wherein the synchronizing device is configured to receive a first tag result and to transfer the first tag result to the switch fabric based on a start of frame signal from the queue block.

7. A network switch comprising:

a switch port having a port filter configured to receive at least a portion of a data frame including layer 3 information and to generate a tag result, a queue block configured for transferring the data frame from the switch port to a buffer memory, a switch fabric configured for receiving the tag result and for performing a frame forwarding switching decision based on the tag result and monitoring of the transfer of the data frame, and a synchronizing device configured to synchronize the transfer of the tag result to the switch fabric with the transfer of the at least a portion of the data frame to the buffer memory based on a signal from the queue block indicating a status of the transfer of the portion of the data frame to the buffer memory, wherein the synchronizing device is configured to receive a final tag result and to transfer the final tag result to the switch fabric based on an end of frame signal from the queue block.

8. The network switch of claim 6, wherein the synchronizing device includes memory configured for storing the tag result.

9. A network switch comprising:

a switch port having a port filter configured to receive at least a portion of a data frame including layer 3 information and to generate a tag result, a queue block configured for transferring the data frame from the switch port to a buffer memory, a switch fabric configured for receiving the tag result and for performing a frame forwarding switching decision based on the tag result and monitoring of the transfer of the data frame, and a synchronizing device configured to synchronize the transfer of the tag result to the switch fabric with the transfer of the at least a portion of the data frame to the buffer memory based on a signal from the queue block indicating a status of the transfer of the portion of the data frame to the buffer memory, wherein the synchronizing device is configured to generate a preserving signal to preserve a signal from the port filter indicating that the tag result is valid and to reset the preserving signal when the tag result is transferred to the switch fabric.

10. The network switch of claim 6, wherein the synchronizing device includes a state machine configured to control transferring the tag result to the switch fabric.

* * * * *